United States Patent
Proft et al.

(10) Patent No.: US 6,660,243 B1
(45) Date of Patent: Dec. 9, 2003

(54) TITANIUM DIOXIDE METHODS OF PRODUCTION

(75) Inventors: Bernd Proft, Neukirchen-Vluyn (DE); Elke Hirschberg, Moers (DE); Barbara Seling, Ellwangen (DE); Sonja Weyand, Duisburg (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 09/937,156

(22) PCT Filed: Jan. 31, 2000

(86) PCT No.: PCT/EP00/00744

§ 371 (c)(1),
(2), (4) Date: Nov. 20, 2001

(87) PCT Pub. No.: WO00/58007

PCT Pub. Date: Oct. 5, 2000

(30) Foreign Application Priority Data

Mar. 26, 1999 (DE) .......................................... 199 13 839

(51) Int. Cl.⁷ ............................................. C01G 23/047
(52) U.S. Cl. ........................................ 423/610; 502/350
(58) Field of Search ................................. 502/350, 439; 423/610, 616

(56) References Cited

U.S. PATENT DOCUMENTS 4,113,660 A    9/1978    Abe et al.

FOREIGN PATENT DOCUMENTS

| DE | 25 54 198 A | 8/1976 |
| EP | 0 327 723 A | 8/1989 |
| EP | 0 357 506 A | 3/1990 |
| JP | 53 042199 A | 4/1978 |

*Primary Examiner*—Stanley S. Silverman
*Assistant Examiner*—Edward M. Johnson
(74) *Attorney, Agent, or Firm*—Fulbright & Jaworski L.L.P.

(57) ABSTRACT

The bodies are prepared either by pelleting of a pasty mixture of titanium dioxide powder and titanium dioxide sol and/or 1–20% nitric acid, followed by dehydration and calcination at a temperature of between 400 and 1000° C. for between 0.5 and 3.5 hours; or by preparing pellets from the titanium dioxide powder and added water, annealing of the pellets at between 300 and 500° C., saturation of same with titanium dioxide sol or 1–20% nitric acid in a vacuum, followed by drying and finally annealing at a temperature of between 400 and 1000° C. for between 0.5 and 3 hours.

3 Claims, No Drawings

TITANIUM DIOXIDE METHODS OF PRODUCTION

The invention relates to moulded bodies of titanium dioxide having a mean grain size $d_{50}$ of 0.01 to 50 mm, a process for production thereof and use thereof.

Such titanium moulded bodies, which are generally used for fixed bed or fluidised bed systems, must have a sufficiently high strength since otherwise the catalyst will disintegrate when packed in the reactor and/or becomes comminuted or subjected to severe abrasion due to the gas pressure, thermal stress and dynamic loading during the reaction.

U.S. Pat. No. 4,113,660 relates to a process for the production of moulded bodies having improved mechanical strength and consisting largely of titanium dioxide, for use as catalysts or as catalyst supports. These moulded bodies are produced by subjecting titanium dioxide or a precursor substance of titanium dioxide to a calcining treatment at temperatures of 200° to 800° C. in the presence of metatitanic acid sol or gel. The subject of U.S. Pat. No. 4,061,596 is a process for the production of titanium dioxide moulded bodies in which titanium dioxide is calcined at temperatures of 4000 to 800° C. and a mineral acid or carboxylic acid or aluminium oxide or an intermediate of aluminium oxide selected from aluminium hydroxide, aluminium oxide sol and aluminium salts is added to the calcined titanium dioxide. The moulded bodies produced from this mixture are subjected to a calcining treatment at 300° to 800° C. The moulded bodies treated in this way are said to have an improved mechanical strength. In DE-C-41 41 936 a process is described for the production of pellets consisting of titanium dioxide, in which metatitanic acid or orthotitanic acid without additives is treated at a temperature of 120° to 250° C. and under a pressure of 2 to 40 bar for a duration of 0.1 to 30 hours in the presence of water and is then dried. This substance is then formed into pellets under the addition of water in a pelletising device and the pellets are treated at a temperature of 100° to 1000° C. A disc pelletiser or a rotary drum, for example, serves as pelletising device, the hydrothermally treated metatitanic acid or orthotitanic acid being added to the respective pelletising device and being granulated while spraying with water. The produced pellets have a relatively high compression strength of, on average, 3 to 10 N, so that they can be used as bed material in fixed bed as well as in fluidised bed systems.

The object of the present invention is to provide moulded bodies consisting of titanium dioxide with a mean grain size $d_{50}$ of 0.01 to 50 mm that have an improved compression strength, in which the proportion of foreign ions is extremely low, whose abrasion resistance is large, and that can be produced with normal expenditure and effort without using binders.

This object is achieved by moulded bodies of titanium dioxide that are composed in each case of primary crystallites of titanium dioxide in the anatase modification with a crystallite size according to Scherrer of up to 40 nm, preferably 10 to 30 nm, whose specific surface is 20 to 150 m²/g, whose pore volume is 0.1 to 0.45 cm³/g, and whose pore diameter is 100 to 300 Å.

The best compression strength is achieved if primary crystallites either with a grain size of 4 to 10 mm or with a grain size of 10 to 15 mm are used for the moulded bodies.

The production of the moulded bodies consisting of titanium dioxide is carried out according to the invention by drying the moulded bodies produced from a paste-like mixture of titanium oxide powder and titanium oxide sol consisting of primary crystallites and/or 1 to 15% nitric acid and then annealing the moulded bodies at a temperature of 400° to 1000° C. for up to 3 hours, preferably 0.5 to 2.5 hours. The crystallite size after the annealing is 10 to 40 μm.

For the purposes of the preferred modification of the invention, the paste-like mixture consists of 1 to 50 wt. % of titanium dioxide powder and 50 to 99 wt. % of titanium dioxide sol and/or 1 to 15% nitric acid.

Having regard to the comparatively high abrasion resistance of the moulded bodies it has proved extremely advantageous if the titanium dioxide powder is, before the preparation of the paste, pre-processed at a temperature of 120° to 250° C. and under a pressure of 2 to 40 bar for a period of 0.1 to 30 hours in the presence of water and is then dried.

The moulded bodies according to the invention consisting of titanium dioxide can also be produced by forming the titanium dioxide powder consisting of primary crystallites into pellets with the addition of water, annealing the pellets at temperatures of 300° to 500° C., then impregnating them with titanium dioxide sol and/or 1 to 15% nitric acid, next drying the pellets and finally annealing the pellets at a temperature of 400° to 1000° C. for up to 3 hours, preferably 1 to 2 hours.

The advantages achieved with the invention are in particular that the resistance to crushing of the cylindrical and prism-shaped moulded bodies is in each case at least 7 N/mm, that of the spherical moulded bodies is in each case at least 15 N, and the abrasion resistance is <1%.

The invention is described in more detail hereinafter with the aid of several exemplifying embodiments:

1$^{st}$ EXEMPLIFYING EMBODIMENT

A dimensionally stable paste produced from 36 wt. % of titanium dioxide powder in the anatase modification having a mean primary crystallite size $d_{50}$ according to Scherrer of 8 nm and a specific surface according to BET of 337 m²/g and 64 wt. % of titanium dioxide sol with a content of 40 wt. % of titanium dioxide, by mixing, is extruded into strands with a diameter of 4 mm, moulded bodies 5 to 15 mm long are cut from the strands, the moulded bodies are dried at 110° C., and in each case a moulded body batch of 150 g is annealed at a temperature of 400° C., 600° C. and 800° C. for two hours.

After the 400° C. annealing, the moulded bodies have a mean resistance to crushing of 7 N/mm per moulded body, a specific surface of 125 m²/g, a pore volume of 0.41 ml/g, a mean pore diameter of 131 Å and an abrasion resistance of <1%.

After the 600° C. annealing, the moulded bodies have a mean resistance to crushing of 9 N/mm per moulded body, a specific surface of 75 m²/g, a pore volume of 0.34 ml/g, a mean pore diameter of 181 Å and an abrasion resistance of <1%.

After the 800° C. annealing, the moulded bodies have a mean resistance to crushing of 23 N/mm per moulded body, a specific surface of 22 m²/g, a pore volume of 0.15 ml/g, a mean pore diameter of 260 Å and an abrasion resistance of <1%.

2$^{nd}$ EXEMPLIFYING EMBODIMENT

A titanium dioxide powder in the anatase modification is mixed with water, and the mixture is processed at a temperature of 175° C. and a pressure of 20 bar. The titanium dioxide powder pre-processed in this way having a mean primary crystallite size $d_{50}$ according to Scherrer of 12 nm and a specific surface of 103 m²/g is then dried and next worked up with 66 wt. % of titanium dioxide sol containing 40 wt. % of titanium dioxide into a dimensionally stable paste. The paste is extruded into strands of diameter 4 mm, cut into 5 to 15 mm long moulded bodies, the moulded bodies are dried, and in each case 150 g of moulded bodies are annealed at a temperature of 400° C., 600° C. and 800° C. for two hours.

After the 400° C. annealing the moulded bodies have a mean resistance to crushing of 8 N/mm per moulded body, a specific surface of 100 m$^2$/g, a pore volume of 0.34 ml/g, a mean pore diameter of 137 Å and an abrasion resistance of <1%.

After the 600° C. annealing the moulded bodies have a mean resistance to crushing of 13 N/mm per moulded body, a specific surface of 63 m$^2$/g, a pore volume of 0.27 ml/g, a mean pore diameter of 170 Å and an abrasion resistance of <1%.

After the 800° C. annealing the moulded bodies have a mean resistance to crushing of 24 N/mm per moulded body, a specific surface of 13 m$^2$/g, a pore volume of 0.08 ml/g, a mean pore diameter of 254 Å and an abrasion resistance of <1%.

3$^{rd}$ EXEMPLIFYING EMBODIMENT

The titanium dioxide powder pretreated according to the second exemplifying embodiment is mixed with 63 wt. % of titanium dioxide sol with a titanium content of 40 wt. % to form a dimensionally stable paste, which is then extruded into strands with a diameter of 4 mm. The strands are further processed as described in the second exemplifying embodiment.

After the 400° C. annealing the moulded bodies have a mean resistance to crushing of 14 N/mm per moulded body, a specific surface of 100 m$^2$/g, a pore volume of 0.35 ml/g, a mean pore diameter of 254 Å and an abrasion resistance of <1%.

After the 600° C. annealing the moulded bodies have a mean resistance to crushing of 21 N/mm per moulded body, a specific surface of 56 m$^2$/g, a pore volume of 0.26 ml/g, a mean pore diameter of 183 Å and an abrasion resistance of <1%.

After the 800° C. annealing the moulded bodies have a mean resistance to crushing of 22 N/mm per moulded body, a specific surface of 13 m$^2$/g, a pore volume of 0.09 ml/g, a mean pore diameter of 293 Å and an abrasion resistance of <1%.

4$^{th}$ EXEMPLIFYING EMBODIMENT

A titanium dioxide powder produced according to the second exemplifying embodiment is mixed with 5% nitric acid to form a paste and then extruded into strands of 4 mm diameter, and moulded bodies 5 to 15 mm long are cut from the strands and processed further as described in the second exemplifying embodiment.

After the 400° C. annealing the moulded bodies have a mean resistance to crushing of 13 N/mm per moulded body, a specific surface of 83.2 m$^2$/g, a pore volume of 0.27 ml/g, a mean pore diameter of 128 Å and an abrasion resistance of <1%.

After the 600° C. annealing the moulded bodies have a mean resistance to crushing of 22 N/mm per moulded body, a specific surface of 58 m$^2$/g, a pore volume of 0.22 ml/g, a mean pore diameter of 149 Å and an abrasion resistance of <1%.

After the 800° C. annealing the moulded bodies have a mean resistance to crushing of 40 N/mm per moulded body, a specific surface of 10.4 m$^2$/g, a pore volume of 0.06 ml/g, a mean pore diameter of 241 Å and an abrasion resistance of <1%.

5$^{th}$ EXEMPLIFYING EMBODIMENT

A titanium dioxide powder in the anatase modification is mixed with water, the mixture is treated at a temperature of 175° C. and a pressure of 20 bar, and is then dried. This hydrothermally pretreated titanium dioxide powder with a mean primary crystallite size $d_{50}$ according to Scherrer of 12 nm and a specific surface of 103 m$^2$/g is formed into pellets with the aid of a disc pelletiser and spraying with water. The pellet diameter is, after screening, 2.5 to 3 mm. The pellets are dried at a temperature of 110° C. and then annealed at a temperature of 400° C. for 3 hours. The pellets are then impregnated in vacuo with a titanium dioxide sol having a titanium dioxide content of 35 wt. %, redried at 110° C., and then in each case 150 g of pellets are annealed at a temperature of 400° C., 600° C. and 800° C. for two hours.

After the 400° C. annealing the moulded bodies have a mean resistance to crushing of 16 N per pellet, a specific surface of 98 m$^2$/g, a pore volume of 0.37 ml/g, a mean pore diameter of 151 Å and an abrasion resistance of <1%.

After the 600° C. annealing the moulded bodies have a mean resistance to crushing of 19 N per pellet, a specific surface of 67 m$^2$/g, a pore volume of 0.30 ml/g, a mean pore diameter of 176 Å and an abrasion resistance of <1%.

After the 800° C. annealing the moulded bodies have a mean resistance to crushing of 41 N per pellet, a specific surface of 19.2 m$^2$/g, a pore volume of 0.12 ml/g, a mean pore diameter of 259 Å and an abrasion resistance of <1%.

In order to determine the resistance to crushing of the moulded bodies, these are subjected between two compression plates of a compression test press to a continuously increasing pressure up to the fracture point. In this connection 10 cylindrical test bodies (d =4 mm, l=5 to 15 mm) are subjected to pressure perpendicular to their longitudinal axis and the compression strength per mm of length (N/mm) is determined and the mean value is calculated from the 10 measurement values. With pellets, their compression strength N is given as the mean value of 10 measurements on spherically shaped moulded bodies.

In order to determine the abrasion, in each case 100 g of test bodies having a fine grain fraction of <4 mm is screened, the screen overflow is added to a cylindrical vessel (d=80 mm, h=160 mm), the closed vessel is rotated about its longitudinal axis for 15 minutes at 120 rpm, the vessel is emptied, and the fine grain fraction of <1 mm is screened. The abrasion in % is calculated from the weight difference of the two screen overflows.

The determination of the specific surface of the moulded bodies is carried out according to the BET method.

The pore volume and pore diameter are determined according to the nitrogen desorption method and evaluated according to the BJH method.

The moulded bodies have a large specific surface, a large pore volume with a narrow pore spectrum, a high compression strength, a high abrasion resistance, a good thermal stability, and are resistant to acids, alkalis and oxidising agents. On account of the semiconducting property of titanium dioxide, the moulded bodies exhibit UV activity. These properties mean that the moulded bodies are suitable for example as catalysts, as photocatalysts, as catalyst supports, as filters/frits, as the stationary phase in chromatography, as pharmaceutical retard supports and as oxygen sensors.

What is claimed is:

1. Process for the production of moulded bodies of titanium dioxide with a mean grain size $d_{50}$ of 0.01 to 50 mm, that are composed in each case of primary crystallites of titanium dioxide in the anatase modification with a crystallite size according to Scherrer of up to 40 nm and that have a specific surface determined according to the BET method of 20 to 150 $m^2/g$, a pore volume of 0.1 to 0.45 $cm^3/g$, and a pore diameter of 100 to 300 Å, characterised in that the titanium dioxide powder is pre-processed at a temperature of 120° to 250° C. and under a pressure of 2 to 40 bar for a duration of 0.1 to 30 hours in the presence of water and is then dried, the moulded bodies produced from a paste-like mixture of the thus pretreated titanium dioxide powder and titanium dioxide sol and/or 1 to 20% nitric acid are dried and are then annealed at a temperature of 400° to 1000° C. for a duration of 0.5 to 3.5 hours, preferably 1.5 to 2.5 hours.

2. Process according to claim 1, characterised in that the paste-like mixture consists of 1 to 50 wt. % of titanium dioxide powder and 50 to 99 wt. % of titanium dioxide sol and/or 1 to 15% nitric acid.

3. Process for the production of moulded bodies of titanium dioxide with a mean grain size $d_{50}$ of 0.1 to 50 mm, that are in each case composed of primary crystallites of titanium dioxide in the anatase modification with a primary crystallite size according to Scherrer of up to 40 nm and that have a specific surface determined according to the BET method of 20 to 150 $m^2/g$, a pore volume of 0.1 to 0.45 $cm^3/g$, and a pore diameter of 100 to 300 Å, characterised in that the titanium dioxide powder is formed into pellets with the addition of water, the pellets are annealed at temperatures of 300° to 500° C., are next impregnated in vacuo with titanium dioxide sol or 1 to 20% nitric acid, and are dried and then annealed at a temperature of 400 to 1000° C. for 3 hours, preferably 1.5 to 2.5 hours.

* * * * *